(12) United States Patent
Yamashiro (10) Patent No.: US 11,834,060 B2
(45) Date of Patent: Dec. 5, 2023

(54) SYSTEM AND METHOD FOR MANAGING VEHICLE SUBSCRIPTIONS

(71) Applicants: DENSO International America, Inc., Southfield, MI (US); DENSO CORPORATION, Aichi-pref. (JP)

(72) Inventor: Takahisa Yamashiro, Southfield, MI (US)

(73) Assignees: DENSO International America, Inc., Southfield, MI (US); DENSO CORPORATION, Kariya (JP)

( * ) Notice: Subject to any disclaimer, the term of this patent is extended or adjusted under 35 U.S.C. 154(b) by 106 days.

(21) Appl. No.: 16/836,343

(22) Filed: Mar. 31, 2020

(65) Prior Publication Data
US 2021/0300398 A1     Sep. 30, 2021

(51) Int. Cl.
*B60W 50/14*      (2020.01)
*G01C 21/36*      (2006.01)

(52) U.S. Cl.
CPC ......... *B60W 50/14* (2013.01); *G01C 21/3682* (2013.01); *G01C 21/3697* (2013.01); *B60W 2050/146* (2013.01)

(58) Field of Classification Search
CPC .................................................. B60W 50/14
See application file for complete search history.

(56) References Cited

U.S. PATENT DOCUMENTS

| | | | |
|---|---|---|---|
| 7,437,375 B2 * | 10/2008 | Borthakur | G06F 16/10 |
| 8,949,016 B1 | 2/2015 | Ferguson et al. | |
| 9,325,650 B2 | 4/2016 | Yalavarty et al. | |
| 9,387,813 B1 * | 7/2016 | Moeller | B60R 11/04 |
| 9,944,282 B1 * | 4/2018 | Fields | A61B 5/7282 |
| 9,963,106 B1 * | 5/2018 | Ricci | G08G 1/096725 |
| 10,013,878 B2 * | 7/2018 | Ricci | H04L 63/0236 |
| 10,343,485 B1 * | 7/2019 | Yaldo | H04W 4/70 |
| 10,395,532 B2 | 8/2019 | Lamprecht et al. | |
| 10,633,003 B1 * | 4/2020 | Abundis Vargas | H04W 4/027 |
| 2005/0060069 A1 * | 3/2005 | Breed | G08G 1/166 |
| | | | 701/408 |
| 2005/0134440 A1 * | 6/2005 | Breed | G01S 17/931 |
| | | | 701/45 |
| 2008/0178196 A1 * | 7/2008 | Heidloff | G06F 16/24568 |
| | | | 719/318 |

(Continued)

FOREIGN PATENT DOCUMENTS

DE      102011118149 A1 * 11/2011
WO      2018/210401        11/2018

OTHER PUBLICATIONS

Google Machine Translation for Japanese Patent Pub. No.; JP4984861B2 (Dec. 6, 2006).*

(Continued)

*Primary Examiner* — Jean Paul Cass
(74) *Attorney, Agent, or Firm* — Harness, Dickey & Pierce, P.L.C.

(57) ABSTRACT

A method includes determining a travel state of a subject vehicle based on vehicle data and selecting one or more desired topics from a set of subscriptions based on the travel state. The set of subscriptions include one or more topics stored in a database, and the one or more desired topics are selected from among the one or more topics. The method further includes subscribing to the one or more desired topics provided by a remote server.

17 Claims, 6 Drawing Sheets

(56) References Cited

U.S. PATENT DOCUMENTS

| | | | |
|---|---|---|---|
| 2013/0029599 A1 | 1/2013 | Santori et al. | |
| 2016/0050269 A1 | 2/2016 | Botticelli | |
| 2016/0144853 A1* | 5/2016 | Stenneth | G08G 1/096758 701/1 |
| 2016/0223343 A1* | 8/2016 | Averbuch | G01C 21/26 |
| 2017/0098197 A1* | 4/2017 | Yu | G16H 10/60 |
| 2018/0077648 A1* | 3/2018 | Nguyen | H04L 51/18 |
| 2019/0049958 A1* | 2/2019 | Liu | G01S 17/00 |
| 2019/0050790 A1* | 2/2019 | Ferguson | G06K 19/0723 |
| 2019/0052522 A1 | 2/2019 | Makkiya et al. | |
| 2019/0082377 A1* | 3/2019 | Silver | H04W 4/027 |
| 2019/0090097 A1 | 3/2019 | Burdette et al. | |
| 2019/0130491 A1* | 5/2019 | Jackson | G06Q 40/08 |
| 2019/0173951 A1 | 6/2019 | Sumcad et al. | |
| 2019/0260204 A1* | 8/2019 | Koval | G06Q 30/0206 |
| 2019/0340013 A1* | 11/2019 | Cella | G06Q 20/123 |
| 2020/0019161 A1* | 1/2020 | Stenneth | B60W 50/14 |
| 2020/0041997 A1* | 2/2020 | Tuukkanen | G05D 1/0088 |
| 2020/0062250 A1* | 2/2020 | Boulton | G05D 1/0088 |
| 2020/0076915 A1 | 3/2020 | Sullivan et al. | |
| 2020/0150667 A1* | 5/2020 | Rakshit | A61B 5/747 |
| 2020/0156652 A1* | 5/2020 | Abundis Vargas | G07C 5/0808 |
| 2020/0164895 A1* | 5/2020 | Boss | B60W 50/082 |
| 2020/0164897 A1* | 5/2020 | Krome | B60W 50/0098 |
| 2020/0210576 A1* | 7/2020 | Chistyakov | G06N 5/04 |
| 2020/0255026 A1* | 8/2020 | Katardjiev | B60W 10/20 |
| 2020/0282961 A1* | 9/2020 | Heinz | B60S 3/04 |
| 2020/0394708 A1* | 12/2020 | Cella | G06F 18/23 |
| 2021/0104155 A1 | 4/2021 | Xu | B60W 50/14 |
| 2021/0173399 A1* | 6/2021 | Richard | B60W 40/12 |
| 2021/0209388 A1* | 7/2021 | Ciftci | G06N 3/08 |

OTHER PUBLICATIONS

International Search Report for International Application No. PCT/JP2021/008623, dated May 25, 2021.

* cited by examiner

SYSTEM AND METHOD FOR MANAGING VEHICLE SUBSCRIPTIONS

FIELD

The present disclosure relates to systems and methods for managing vehicle subscriptions.

BACKGROUND

The statements in this section merely provide background information related to the present disclosure and may not constitute prior art.

Vehicles may receive information using various communication protocols. As an example, vehicles may receive information using at least one of a vehicle-to-vehicle, vehicle-to-infrastructure, vehicle-to-network, vehicle-to-pedestrian, vehicle-to-device, and vehicle-to-grid communication system (collectively or individually referred to as V2X system(s)). As another example, vehicles may receive information using a publish/subscribe messaging protocol, such as a message queue telemetry transport (MQTT) system.

However, vehicles may receive large amounts of information using the V2X system or the MQTT system. As such, substantial amounts of computing resources may be needed to generate and/or receive the large amounts of information, and generating and/or receiving large amounts of information may cause latency issues, thereby interfering with the vehicle's ability to perform time-sensitive functions based on the received information.

SUMMARY

This section provides a general summary of the disclosure and is not a comprehensive disclosure of its full scope or all of its features.

The present disclosure provides a method including determining a travel state of a subject vehicle based on vehicle data. The method includes selecting one or more desired topics from a set of subscriptions based on the travel state, where the set of subscriptions include one or more topics stored in a database, and the one or more desired topics are selected from among the one or more topics. The method includes subscribing to the one or more desired topics provided by a remote server.

In some forms, the vehicle data is provided by a component within the subject vehicle, and determining the travel state of the subject vehicle based on the vehicle data further comprises determining at least one of a metric based on the vehicle data and a status of the component based on the vehicle data.

In some forms, selecting the one or more desired topics from the set of subscriptions based on the travel state further includes identifying the one or more desired topics based on the metric.

In some forms, determining the metric based on the vehicle data provided by the component further includes determining whether the vehicle data indicates at least one of a travel direction of the subject vehicle and the subject vehicle is in a parked state.

In some forms, determining the status of the component further includes determining whether a fault is associated with the component, where the one or more desired topics selected from the set of subscriptions are associated with the fault.

In some forms, determining the status of the component further includes determining whether information generated by a sensor of the subject vehicle, as the component, indicates that the sensor is properly functioning.

In some forms, when the sensor of the subject vehicle, as the component, indicates that the sensor is not properly functioning, selecting the one or more desired topics from the set of subscriptions further comprises identifying the one or more desired topics associated with the sensor.

In some forms, subscribing to the one or more desired topics further includes modifying a subscription request message to include data indicative of the one or more desired topics. In some forms, subscribing to the one or more desired topics further includes transmitting the subscription request message to the remote server.

In some forms, the vehicle data is provided by a roadside unit.

In some forms, selecting the one or more desired topics from the set of subscriptions based on the travel state further includes: comparing the one or more desired topics to one or more currently subscribed topics of the subject vehicle, where the one or more currently subscribed topics are stored in the database and are among the one or more topics; and modifying the one or more currently subscribed topics of the subject vehicle to match the one or more desired topics in response to the comparing indicating that the one or more currently subscribed topics do not match the one or more desired topics.

In some forms, the method further includes transmitting a topic suggestion message that identifies the one or more desired topics to a remote vehicle communicatively coupled to the subject vehicle.

In some forms, the one or more desired topics represent at least one of traffic information and point-of-interest information.

The present disclosure also includes subscription management system for a subject vehicle. The subscription management system includes: a processor; a subscription database storing a set of subscriptions, where the set of subscriptions include one or more topics; and a nontransitory computer-readable medium including instructions that are executable by the processor. The instructions include determining a travel state of the subject vehicle based on vehicle data. The instructions include selecting one or more desired topics from the set of subscriptions based on the travel state, where the one or more desired topics are selected from among the one or more topics. The instructions include subscribing to the one or more desired topics provided by a remote server.

In some forms, the vehicle data is provided by a component within the subject vehicle, and the instructions for determining the travel state of the subject vehicle based on the vehicle data further include determining at least one of a metric based on the vehicle data and a status of the component based on the vehicle data.

In some forms, the instructions for selecting the one or more desired topics from the set of subscriptions based on the travel state further includes identifying the one or more desired topics based on the metric.

In some forms, the instructions for determining the metric based on the vehicle data provided by the component further includes determining whether the vehicle data indicates at least one of a travel direction of the subject vehicle and the subject vehicle is in a parked state.

In some forms, the instructions for determining the status of the component further includes determining whether a fault is associated with the component, where the one or more desired topics selected from the set of subscriptions are associated with the fault.

In some forms, the instructions for determining the status of the component further includes determining whether information generated by a sensor of the subject vehicle, as the component, indicates that the sensor is properly functioning.

In some forms, the instructions for subscribing to the one or more desired topics further includes: modifying a subscription request message to include data indicative of the one or more desired topics, and transmitting the subscription request message to the remote server.

In some forms, the vehicle data is provided by a roadside unit, and the instructions for selecting the one or more desired topics from the set of subscriptions based on the travel state further includes: comparing the one or more desired topics to one or more currently subscribed topics of the subject vehicle, where the one or more currently subscribed topics are stored in the subscription database and are among the one or more topics, and modifying the one or more currently subscribed topics of the subject vehicle to match the one or more desired topics in response to the comparing indicating that the one or more currently subscribed topics do not match the one or more desired topics.

Further areas of applicability will become apparent from the description provided herein. It should be understood that the description and specific examples are intended for purposes of illustration only and are not intended to limit the scope of the present disclosure.

DRAWINGS

In order that the disclosure may be well understood, there will now be described various forms thereof, given by way of example, reference being made to the accompanying drawings, in which.

The drawings described herein are for illustration purposes only and are not intended to limit the scope of the present disclosure in any way.

DETAILED DESCRIPTION

The following description is merely exemplary in nature and is not intended to limit the present disclosure, application, or uses. It should be understood that throughout the drawings, corresponding reference numerals indicate like or corresponding parts and features.

The present disclosure relates to a system and method for selectively modifying a set of subscriptions of a vehicle. The systems and methods described herein relate to the vehicle receiving various information using a publish/subscribe messaging protocol. In one form, to manage the amount of information being received, the vehicle is configured to dynamically update a set of subscriptions based on vehicle data received from a component of the vehicle, such as a vehicle sensor (e.g., image data obtained from an image sensor of the vehicle), and/or a nearby roadside unit, thereby reducing the latency and resources needed to receive information of interest to the vehicle and/or an operator of the vehicle.

Figure 1:
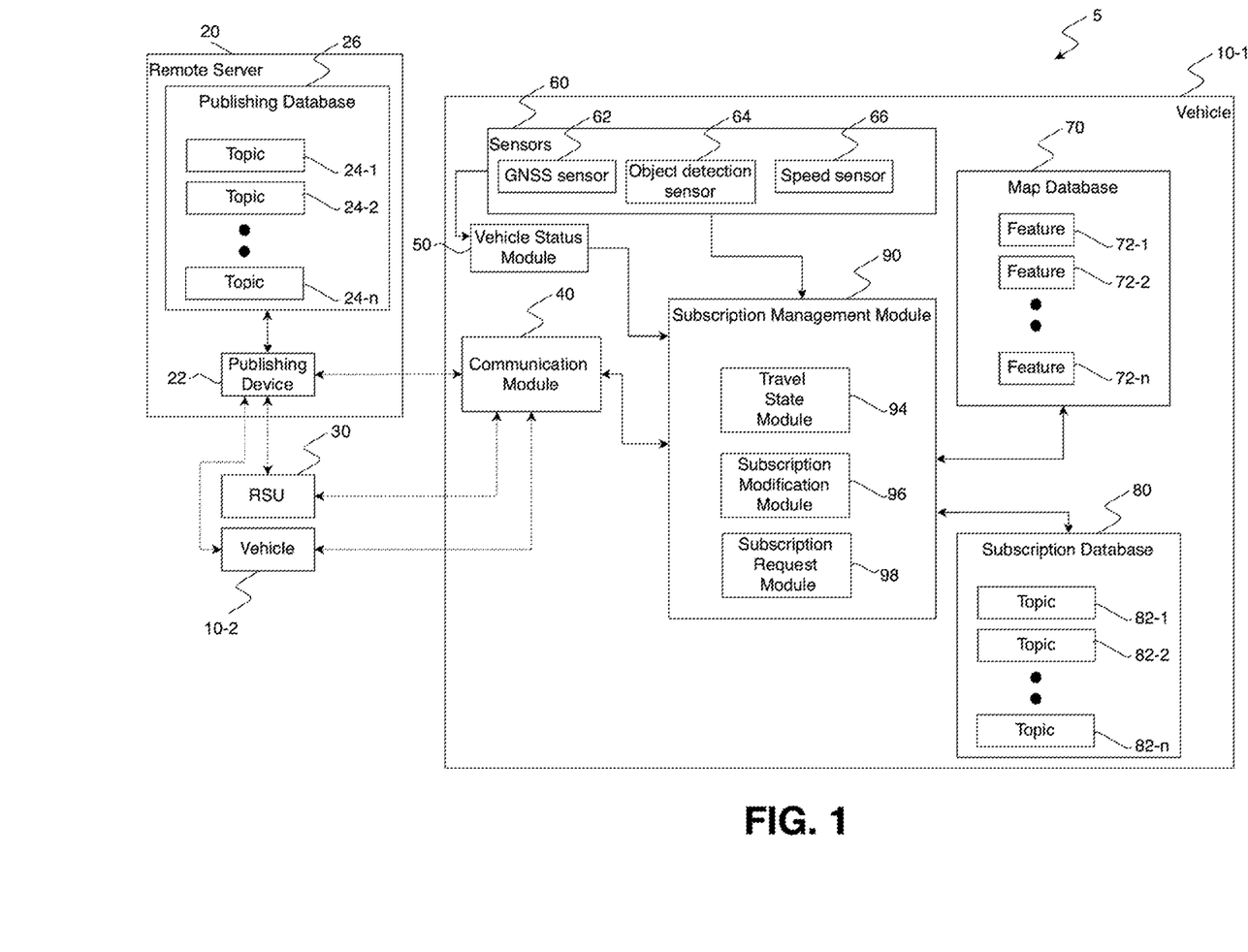
FIG. 1 is a block diagram of an example system in accordance with the teachings of the present disclosure.

Referring to FIG. 1, a functional block diagram of an example system 5 is shown. In some forms, the system 5 includes a subject vehicle 10-1, a remote vehicle 10-2, a remote server 20, and a roadside unit (RSU) 30. The subject vehicle 10-1 may include a communication module 40, a vehicle status module 50, and sensors 60. The subject vehicle 10-1 may also include a map database 70, a subscription database 80, and a subscription management module 90.

In one form, the remote server 20 is a computing device that is communicatively coupled to the subject vehicle 10-1, the remote vehicle 10-2, and the RSU 30. In order to perform the functionality described herein, each of the subject vehicle 10-1, the remote vehicle 10-2, the remote server 20, and the RSU 30 may include one or more processor circuits configured to execute instructions stored in a nontransitory computer-readable medium, such as a random-access memory (RAM) circuit and/or read-only memory (ROM) circuit.

In some forms, the remote server 20 may be a messaging broker of a MQTT system. Although the remote server 20 described herein relates to an MQTT system, it should be understood that other publish-subscribe messaging systems may be used and is not limited to the publish-subscribe messaging system described herein. As used herein, the phrase "publish-subscribe messaging systems" refers to systems that utilize a messaging broker for sending and receiving messages between the subject vehicle 10-1, the remote vehicle 10-2, and the RSU 30.

In some forms, the remote server 20 authenticates and authorizes the subject vehicle 10-1, the remote vehicle 10-2, and the RSU 30 so that each time one of the subject vehicle 10-1, the remote vehicle 10-2, and the RSU 30 attempts to transmit/receive information, a new communication link does not need to be formed or maintained. Moreover, by maintaining a single connection for each of the subject vehicle 10-1, the remote vehicle 10-2, and the RSU 30, information can be communicated between the subject vehicle 10-1, the remote vehicle 10-2, and the RSU 30 using the remote server 20. Accordingly, the remote server 20 reduces the latency of forming the direct communication links resulting from, for example, various authentication and authorization routines associated with forming direct communication links.

The remote server 20 may selectively transmit information to an external device, such as the subject vehicle 10-1, the remote vehicle 10-2, and/or the RSU 30, in response to a publishing device 22 of the remote server 20 receiving a control message from the external device. The control message may include information corresponding to at least one of a plurality of topics 24-1, 24-2, . . . 24-n (collectively referred to as topics 24) in a publishing database 26. In some forms, the topics 24 may include, but are not limited to, traffic information, construction information, safety information, weather information, point-of-interest information, among others, as described below in further detail. As used herein, "traffic information" refers to information that describes a traffic condition, such as an amount of traffic, an estimated time of arrival, delays caused by traffic, alternative routes, among others. As used herein, "construction information" refers to any information that describes construction on a roadway, such as lane closures resulting from construction, length of a construction zone, times in which a construction zone is active, delays caused by construction, alternative routes, among others. As used herein, "safety information" refers to any information related to the safety of the vehicle, such as speed limits, impairments of local systems of the subject vehicle 10-1 (e.g., impairment of a lane-detection system that obtains from an image sensor and performs image-processing to detect a lane), among others. As used herein, "weather information" refers to any information describing weather conditions at a particular location, such as temperature, wind, precipitation, humidity, road conditions associated with the weather, among others. As used herein, "point-of-interest information" refers to any location that may be of interest to an occupant within the subject vehicle 10-1, such as a restaurant, hotel, museum, among others. The point-of-interest information may be predefined or may be dynamically updated based on, for example, a machine learning and/or artificial intelligence system of the subject vehicle 10-1 and/or a device communicatively coupled to the subject vehicle 10-1 (e.g., a cellular device, a laptop, among others).

As an example, in response to receiving the control message, the remote server 20 may transmit a message corresponding to topic 24-1 to the subject vehicle 10-1 when the subject vehicle 10-1 is subscribed to topic 24-1. As another example, in response to receiving the control message, the remote server 20 may not transmit a message corresponding to topic 24-2 to the remote vehicle 10-2 when the remote vehicle 10-2 is not subscribed to topic 24-2. As described below in further detail, the subject vehicle 10-1 may selectively manage the topics 24 in which it is subscribed to based on information received from the vehicle status module 50 and the sensors 60.

With regard to subject vehicle 10-1, the communication module 40 is configured to communicate with external device such as the remote server 20. In one form, the communication module 40 may include one or more transceivers, radio circuits, amplifiers, modulation circuits, processor circuits, memory circuits, among others, to transmit/receive messages to/from the remote server 20 via a publish-subscribe messaging protocol. As an example, the communication module 40 may transmit/receive messages using a cellular signal, long term evolution (LTE) signal, 5G signal, and/or other similar wireless signals. While the communication module 40 is shown as included within the subject vehicle 10-1, it should be understood that the remote vehicle 10-2 may also include the communication module 40.

In some forms, the communication module 40 may include a V2X system, which is one of a vehicle-to-vehicle, vehicle-to-infrastructure, vehicle-to-network, vehicle-to-pedestrian, vehicle-to-device, and vehicle-to-grid system that transmits and receives messages using, for example, a dedicated short-range communication (DSRC) system, a cellular-V2X and/or the like. The V2X system of the communication module 40 may include one or more transceivers, radio circuits, amplifiers, modulation circuits, processor circuits, memory circuits, among others, to perform the functionality described herein. The V2X system of the communication module 40 enables the subject vehicle 10-1 to form a communication link with other vehicles (e.g., remote vehicle 10-2) or infrastructure equipped with a V2X system (e.g., the RSU 30) by using a 75 megahertz (MHz) band around a 5.9 gigahertz (GHz) signal. It should be understood that other communication systems, center frequencies, and/or bandwidths may be implemented within the V2X system of the communication module 40 in other forms. The V2X system of the communication module 40 may be configured to transmit and receive signals representing, for example, early warnings of accidents and driving hazards to and from other V2X systems provided at remote vehicles, infrastructure, and/or pedestrians, among others. Additionally, local safety systems communicatively coupled to the V2X system of the communication module 40 may be configured to predict future accidents and driving hazards by calculating the current and future positions of the subject vehicle 10-1 based on communication with external devices, such as remote vehicles, infrastructure, pedestrians, among others.

The vehicle status module 50 may be configured to generate various state information of the subject vehicle 10-1 including, but not limited to, information corresponding to the sensors 60, transmission state information, drivetrain state information, fuel system state information, exhaust system state information, cooling system state information, electrical system state information, among others. In one form, the vehicle status module 50 is configured to generate information indicating whether the sensors 60 are properly functioning. For example, the object detection sensor 64 is improperly functioning if it is not able to obtain accurate image data due to ambient light conditions, a faulty electrical component, etc. In another example, one of the sensors 60 is improperly functioning if it requires a recalibration.

In one form, based on the transmission state of the subject vehicle 10-1, the vehicle status module 50 is configured to generate information indicating the subject vehicle 10-1 is in a parked state when the parking gear is engaged, a neutral state when the neutral gear is engaged, a driving state when the driving gear is engaged, and a reverse state when the reverse gear is engaged. In another form, the vehicle status module 50 is configured to generate information regarding the drivetrain to indicate if the subject vehicle 10-1 is in a four-wheel drive state, a two-wheel drive state, an all-wheel drive state, and/or the like. In order to perform the functionality described herein, the vehicle status module 50 may be implemented by one or more processor circuits that execute machine-readable instructions stored in a nontransitory computer-readable medium, such as ROM circuit and/or RAM circuit.

The sensors 60 may include a global navigation satellite system (GNSS) sensor 62, an object detection sensor 64, and a speed sensor 66. Some or all of the sensors 60 may be communicatively coupled to the subscription management module 90 and/or the vehicle status module 50 using, for example, a controller area network (CAN) bus, a local interconnect network (LIN), a clock extension peripheral interface (CXPI) bus, an ethernet bus, and the like.

The GNSS sensor 62 is configured to generate information representing the location of the subject vehicle 10-1. As an example, the GNSS sensor 62 may include a radio frequency (RF) filter, an RF amplifier, a local oscillator, a frequency mixer, an intermediate frequency (IF) filter, an IF amplifier, and an analog-to-digital converter (ADC). The RF filter and the RF amplifier are configured to suppress image frequencies. The local oscillator is configured to provide a mixing frequency to the frequency mixer in order to change the received frequency into a new, intermediate frequency. The filter and the IF amplifier are configured to amplify the signal received from the frequency mixer and limit the intermediate frequencies to a certain bandwidth. Subsequently, the ADC may convert the filtered intermediate frequency to a digital signal. Based on the digital signal, the subscription management module 90 may calculate location information associated with the subject vehicle 10-1 (e.g., a travel direction), determine a travel state based on the signal, and selectively modify a set of subscriptions of the subject vehicle 10-1, as described below in further detail.

The object detection sensor 64 may be any sensor configured to obtain data corresponding to an object surrounding the subject vehicle 10-1 (e.g., image data), such as a two-dimensional camera, a three-dimensional camera, an infrared sensor, a radar scanner, a laser scanner, a light detection and ranging (LIDAR) sensor, an ultrasonic sensor, and/or the like. In some forms, the object detection sensor 64 may obtain image data of various features of a roadway system, such as traffic infrastructure, lane markings, and/or the like. Furthermore, the subscription management module 90 may determine a travel state based on the data obtained from the object detection sensor 64, and the subscription management module 90 may selectively modify a set of subscriptions of the subject vehicle 10-1 based on the data, as described below in further detail.

The speed sensor 66 may be any sensor configured to generate speed data associated with the subject vehicle 10-1. As an example, the speed sensor 66 may be a wheel speed sensor. Furthermore, the subscription management module 90 may determine a travel state based on the speed data, and the subscription management module 90 may selectively modify a set of subscriptions of the subject vehicle 10-1 based on the speed data, as described below in further detail.

The map database 70 includes a plurality of feature entries 72-1, 72-2, . . . 72-n (collectively referred to as feature entries 72) indicating various features of a roadway system at particular locations. Each of the feature entries 72 may include GNSS coordinate information (e.g., global positioning system (GPS) coordinates) and one or more features associated with the GNSS coordinate information. As an example, one of the feature entries 72 may indicate that at a particular location (as indicated by the GNSS coordinate information), the roadway system includes an intersection, a stop light, two lanes of traffic in each direction, and one right-turn lane in each direction. As another example, another one of the feature entries 72 may indicate that at a particular location (as indicated by the GNSS coordinate information), the roadway system includes four lanes of traffic in each direction, the roadway system is a freeway, and a speed limit of the freeway is 70 mils per hour (mph). It should be understood that the feature entries 72 may indicate various other features of a roadway system and is not limited to the examples described herein.

The subscription database 80 includes a plurality of topics 82-1, 82-2, . . . 82-n (collectively referred to as topics 82) in which the subject vehicle 10-1 may subscribe to. The topics 82 may include, but are not limited to, traffic information, construction information, safety information, weather information, point-of-interest information, among others. Furthermore, each of the topics 82 may include information identifying a corresponding travel state(s) of the subject vehicle 10-1. That is, as described below, the subscription database 80 associates each topic 82 with one or more travel state that indicates when the topic is to be subscribed to.

In some forms, the subject vehicle 10-1 may be subscribed to one or more topics 82, and the subject vehicle 10-1 may be configured to selectively modify the set of the topics 82 in which the subject vehicle 10-1 is subscribed to, as described below in further detail. Accordingly, the subject vehicle 10-1 may be subscribed to only some of the topics 82 at any given instance.

The subscription management module 90 may include a travel state module 94, a subscription modification module 96, and a subscription request module 98. In order to execute the functionality described herein, the subscription management module 90 may be implemented by one or more processor circuits that execute machine-readable instructions stored in a nontransitory computer-readable medium, such as a ROM circuit and/or a RAM circuit.

The travel state module 94 is configured to determine a travel state of the subject vehicle 10-1 based on the data generated by the vehicle status module 50 and one of the corresponding vehicle sensors 60. Determining the travel state may include determining at least one of a metric and a status of a component of the subject vehicle 10-1 based on vehicle data generated by the subject vehicle 10-1.

The travel state module 94 may determine the metric based on vehicle data generated by one of the corresponding vehicle sensors 60. The metric may include, but is not limited to, a location of the subject vehicle 10-1, a travel direction of the subject vehicle 10-1 (e.g., a cardinal direction, a direction on a roadway system, among others), a speed of the subject vehicle 10-1, among others. As an example, the travel state module 94 may receive the sensor data from the speed sensor 66 and calculate a speed of the subject vehicle 10-1. As another example, the travel state module 94 may be configured to determine the location of the subject vehicle 10-1 based on the information received by the GNSS sensor 62. In one variation, the travel state module 94 may obtain multiple locations of the subject vehicle 10-1 and determine a travel direction associated with the subject vehicle 10-1.

In one variation, the travel state module 94 is configured to determine the metric by correlating the feature entries 72 of the map database 70 to the determined location. As an example, based on the location of the vehicle (i.e., location information), the travel state module 94 determines the roadway system using the GNSS coordinates provided with the location information. As indicated by at least one of the feature entries 72, the roadway system can include an intersection, a stop light, two lanes of traffic in each direction, and one right-turn lane in each direction. Accordingly, the travel state module 94 may correlate the location information with the features indicated by at least one of the feature entries 72 to determine the metric of the subject vehicle 10-1.

The travel state module 94 may determine the status of a component of the subject vehicle 10-1 based on vehicle data generated by the vehicle status module 50. As an example, the travel state module 94 may determine, based on the vehicle data received from the vehicle status module 50, that one of the sensors 60 is associated with a fault in response to the sensor improperly functioning. As another example, the travel state module 94 may determine a drive state of the subject vehicle 10-1 based on gear state. For example, if the vehicle status module 50 indicates that the parking gear of the subject vehicle 10-1 is engaged, the travel state module 94 determines that the subject vehicle is parked. As yet another example, the travel state module 94 may determine that the subject vehicle 10-1 is in a four-wheel drive control state based on the drivetrain state information generated by the vehicle status module 50. It should be understood that the state information may be associated with any vehicle communicatively coupled to the vehicle status module 50 and is not limited to the examples described herein.

When the travel state module 94 determines the travel state of the subject vehicle 10-1, the travel state module 94 is configured to compare the travel state to the topics 82 of the subscription database 80. In some forms, comparing the travel state to the topics 82 of the subscription database 80 includes identifying topics 82 associated with the travel state. As an example, if the travel state indicates that the subject vehicle 10-1 is traveling at a predefined speed, the travel state module 94 may identify the topics 82 in the subscription database 80 that are associated with vehicle speeds, such as topics 82 associated with traffic information and safety information. As another example, if the travel state indicates that the subject vehicle 10-1 is at a particular location, the travel state module 94 may identify the topics 82 in the database 80 that are associated with the particular location, such as weather information, point-of-interest information, and construction information. As yet another example, if the travel state indicates that the object detection sensor 64 is not property functioning due to ambient light conditions, the travel state module 94 may identify the topics 82 in the subscription database 80 that are associated with an improper functioning of the object detection sensor 64, such as safety information. As yet another example, if the travel state indicates that the subject vehicle 10-1 is parked, the travel state module 94 may identify the topics 82 in the subscription database 80 that are associated with subject vehicle 10-1 being in a parked state, such as point-of-interest information.

When the topics 82 in the subscription database 80 are identified, the travel state module 94 may determine whether a subscription change condition is satisfied. The subscription change condition may be satisfied when the identified topics 82 associated with the travel state do not match the set of topics 82 that the subject vehicle 10-1 is currently subscribed to. As an example, if the subject vehicle 10-1 is currently subscribed to topic 82-1 and topic 82-2, and the identified topics 82 associated with the travel state include additional or alternative topics 82, the travel state module 94 may determine that the subscription change condition is satisfied. As another example, if the subject vehicle 10-1 is currently subscribed to topic 82-1 and topic 82-2, and the identified topics 82 associated with the travel state include topic 82-1 and 82-2, the travel state module 94 may determine that the subscription change condition is not satisfied.

In response to determining that the subscription change condition is satisfied, the subscription modification module 96 modifies the set of subscriptions of the subject vehicle 10-1 to the identified topics. As an example, the subscription modification module 96 adds and/or removes topics 82 from the set of subscriptions that the subject vehicle 10-1 is currently subscribed to, such that the set of subscriptions includes the identified topics 82 associated with the travel state. Subsequently, the subscription request module 98 transmits, via the communication module 40, the updated set of subscriptions to the remote server 20, thereby enabling the subject vehicle 10-1 to receive information corresponding to the updated set of subscriptions.

In one variation, the travel state module 94 is configured to determine the travel state of the subject vehicle 10-1 based on information received from one of the remote vehicle 10-2 and the RSU 30 via the communication module 40. As an example, the remote vehicle 10-2 and the RSU 30 may transmit information representing the respective sets of subscriptions using, for example, a wave short message (WSM) of a V2X signal. It should be understood that the information represent the respective sets of subscriptions that may be transmitted using other methods and is not limited to the examples provided herein. In response to receiving the V2X signal, the subject vehicle 10-1 may modify the set of subscriptions (e.g., by adding or deleting topics 82 of the set of subscriptions) such that it matches the set of subscriptions of the remote vehicle 10-2 and/or the RSU 30.

In some forms, when the subject vehicle 10-1 modifies the set of subscriptions such that it matches the set of subscriptions of the RSU 30, the subject vehicle 10-1 may transmit, using the subscription request module 98 and via the communication module 40, a topic suggestion message to the remote vehicle 10-2. The topic suggestion message may identify the set of subscriptions of the subject vehicle 10-1. In some forms, the topic suggestion message may be configured to instruct the remote vehicle 10-2 to modify a set of subscriptions of the remote vehicle 10-2 such that it matches the set of subscriptions of the subject vehicle 10-1. Accordingly, the remote vehicle 10-2 can also receive the same information that the subject vehicle 10-1 receives from the remote server 20.

Figure 2:
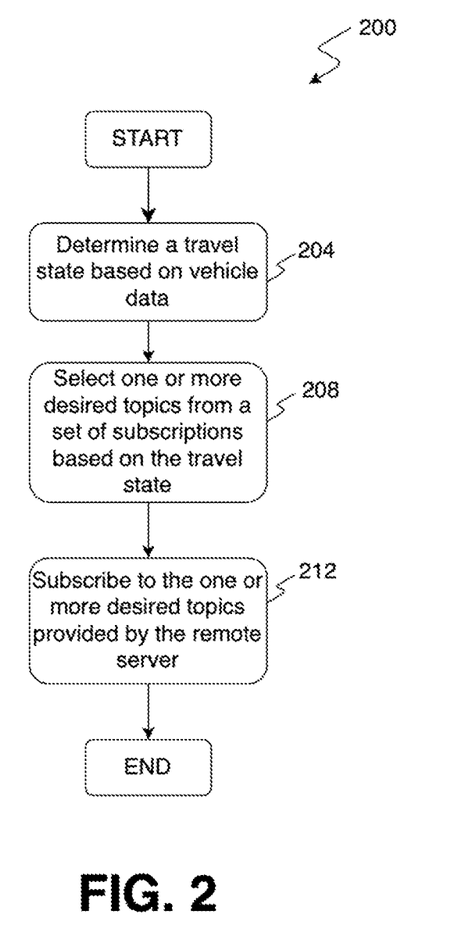
FIG. 2 illustrates an example control routine in accordance with the teachings of the present disclosure.

Referring to FIG. 2, an example control routine 200 for managing the set of subscriptions of the subject vehicle 10-1 is shown. At 204, the subject vehicle 10-1 determines the travel state based on vehicle data provided by at least one of the vehicle sensors 60, the vehicle status module 50, the remote vehicle 10-2 (via the communication module 40), and/or the RSU 30 (via the communication module 40). At 208, the subject vehicle 10-1 selects one or more desired topics 82 from a set of subscriptions based on the travel state. At 212, the subject vehicle 10-1 subscribes to the one or more desired topics 82, which are also provided (e.g., published) by the remote server 20.

Figure 3A:
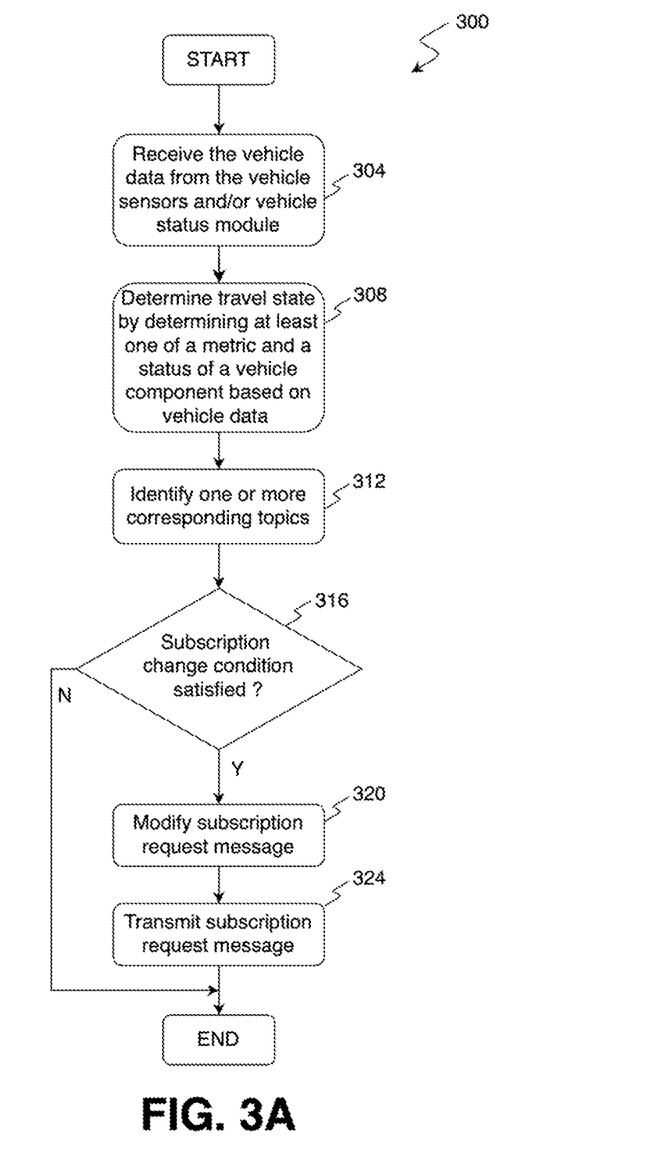
FIG. 3A illustrates an example control routine in accordance with the teachings of the present disclosure.
Figure 3B:
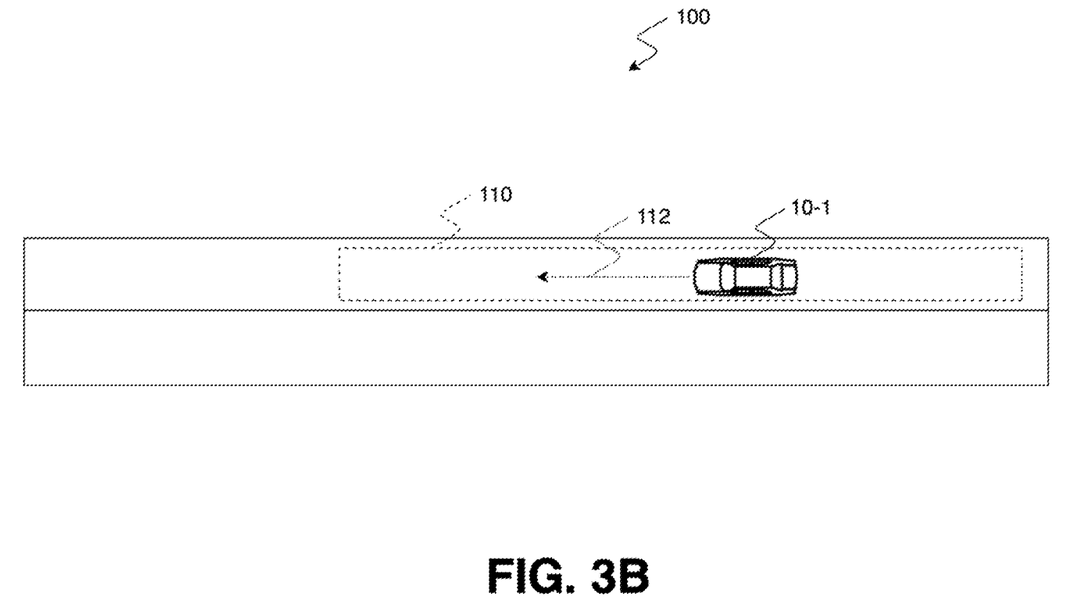
FIG. 3B illustrates an example roadway system in accordance with the teachings of the present disclosure.

Referring to FIGS. 3A and 3B, an example control routine 300 for managing the set of subscriptions of the subject vehicle 10-1 is shown. At 304, the subscription management module 90 receives the vehicle data from the vehicle sensors 60 and/or the vehicle status module 50. At 308, the subscription management module 90 determines the travel state by determining at least one of a metric and/or a status of a vehicle component based on the vehicle data. As an example, the metric may indicate that the subject vehicle 10-1 is located at first GNSS coordinates. The metric may also indicate that the subject vehicle 10-1 is traveling on roadway system 100 and, more particularly, region 110 of the roadway system 100 in a first travel direction indicated by arrow 112, as shown in FIG. 3B.

At 312, the subscription management module 90 identifies one or more corresponding topics 82 of the subscription database 80 based on the metric and/or the status of the vehicle component. As an example, the subscription management module 90 may identify one or more topics 82 that correspond to the first GNSS coordinates, the first travel direction indicated by arrow 112, and/or the region 110.

At 316, the subscription management module 90 determines whether the subscription change condition is satisfied. If so, the control routine 300 proceeds to 320; conversely, if the subscription management module 90 determines that the subscription change condition is not satisfied, the control routine 300 ends. As an example, if the subject vehicle 10-1 is currently subscribed to topic 82-1 and topic 82-2, and the identified topics 82 associated with the first GNSS coordinates, the first travel direction indicated by arrow 112, and/or the region 110 are associated with additional or alternative topics 82, the subscription management module 90 may determine that the subscription change condition is satisfied. As another example, if the subject vehicle 10-1 is currently subscribed to topic 82-1 and topic 82-2, and the identified topics 82 associated with the first GNSS coordinates, the first travel direction indicated by arrow 112, and/or the region 110 include topic 82-1 and 82-2, the subscription management module 90 may determine that the subscription change condition is not satisfied.

At 320, the subscription management module 90 modifies the subscription request message provided to the remote server 20, where the subscription request message indicates a request for the subject vehicle 10-1 to subscribe to a particular set of subscriptions. As an example, if the subject vehicle 10-1 is currently subscribed to topic 82-1 and topic 82-2, and the identified topics 82 associated with the first GNSS coordinates, the first travel direction indicated by arrow 112, and/or the region 110 include additional or alternative topics 82, the subscription management module 90 may modify the subscription request message to include the additional or alternative topics 82. At 324, the subject vehicle 10-1 transmits the subscription request message to the remote server 20. The control routine 300 then ends.

Figure 4A:
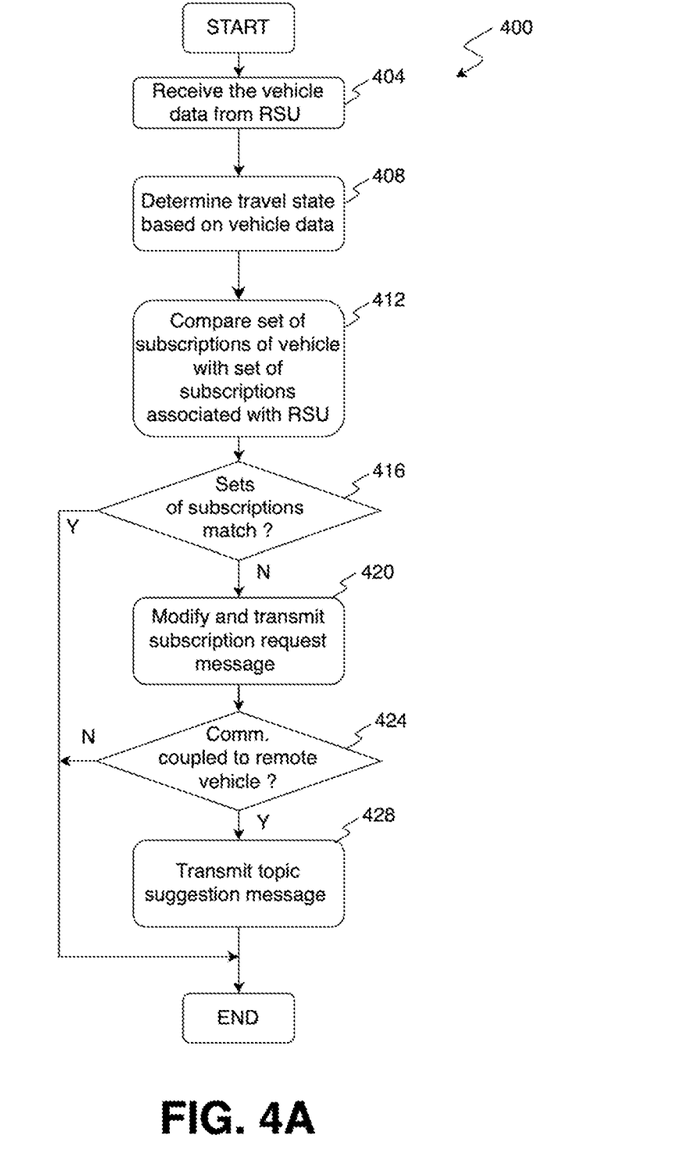
FIG. 4A illustrates an example control routine in accordance with the teachings of the present disclosure.
Figure 4B:
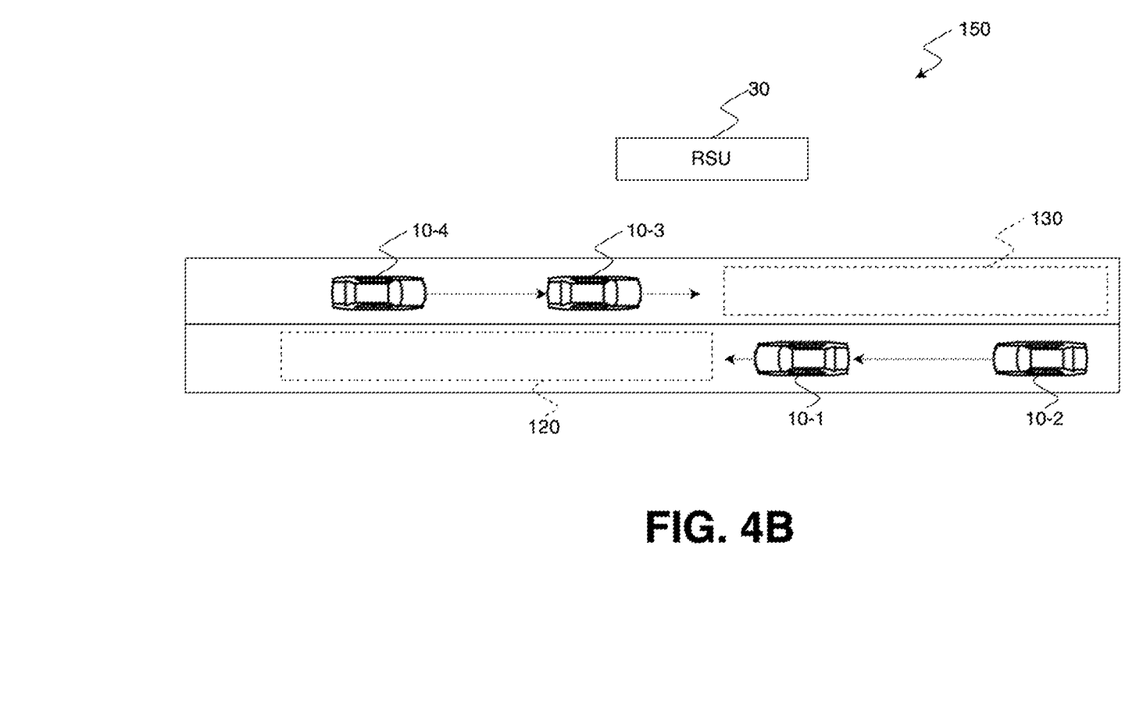
FIG. 4B illustrates an example roadway system in accordance with the teachings of the present disclosure.

Referring to FIGS. 4A and 4B, an example control routine 400 for managing the set of subscriptions of the subject vehicle 10-1 is shown. At 404, the subscription management module 90 receives the vehicle data from the RSU 30 via the communication module 40. At 408, the subscription management module 90 determines a travel state based on the vehicle data. As an example and as shown in FIG. 4B, the subscription management module 90 of subject vehicle 10-1 may determine that one or more GNSS coordinates indicate that the subject vehicle 10-1 is approaching region 120 of roadway system 150. As another example and as shown in FIG. 4B, the subscription management module 90 of remote vehicle 10-3 may determine that one or more GNSS coordinates indicate that the remote vehicle 10-3 is approaching region 130 of roadway system 150.

At 412, the subscription management modules 90 compare the set of subscriptions of the subject vehicle 10-1 with the set of subscriptions associated with the RSU 30 and/or nearby regions. As an example, the vehicle data transmitted by the RSU 30 to subject vehicle 10-1 indicate that the set of subscriptions associated with region 120 include a first set of the plurality of topics 24, and the vehicle data transmitted by the RSU to remote vehicle 10-3 indicate that the set of subscriptions associated with region 130 include a second set of the plurality of topics 24. Subsequently, the subscription management modules 90 of the subject vehicle 10-1 and the remote vehicle 10-3 may compare its current subscriptions to the sets of subscriptions associated with region 120 and region 130, respectively.

At 416, the subscription management modules 90 determine whether the sets of subscriptions of the subject vehicle 10-1 or the remote vehicle 10-3 match the sets of subscriptions of region 120 and region 130, respectively. If the sets of subscriptions do not match, the routine 400 proceeds to 420; conversely, if the sets of subscriptions match, the routine 400 ends.

At 420, the subscription management modules 90 modify the subscription request message transmitted to the remote server 20 such that the set of subscriptions of the subject vehicle 10-1 and/or the remote vehicle 10-3 match the set of subscriptions associated with the corresponding region. At 424, the subscription management modules 90 determine whether the subject vehicle 10-1 or the remote vehicle 10-3 are communicatively coupled to another vehicle. As an example and as shown in FIG. 4B, the subject vehicle 10-1 is communicatively coupled to remote vehicle 10-2, and the remote vehicle 10-3 is communicatively coupled to remote vehicle 10-4. If the subject vehicle 10-1 and the remote vehicle 10-3 are communicatively coupled to another vehicle, the routine 400 proceeds to 428; otherwise, the routine 400 ends.

At 428, the subscription management modules 90 transmit a topic suggestion message to the communicatively coupled vehicles, and the topic suggestion message causes the communicatively coupled vehicles to modify the corresponding set of subscriptions to match the set of subscriptions associated with the corresponding region. As an example, the subject vehicle 10-1 transmits a topic suggestion message to remote vehicle 10-2, and the topic suggestion message causes remote vehicle 10-2 to modify its set of subscriptions to match the set of subscriptions associated with region 120. As another example, the remote vehicle 10-3 transmits a topic suggestion message to remote vehicle 10-4, and the topic suggestion message causes remote vehicle 10-4 to modify its set of subscriptions to match the set of subscriptions associated with region 130.

It should be readily understood that the routines 200, 300, 400 are just example control routines, and other control routines may be implemented.

By executing routines 200, 300, and/or 400, the vehicles are configured to dynamically update a set of subscriptions based on vehicle data received from a component of the vehicle and/or a roadside unit, thereby reducing the latency and resources needed to receive information of interest to the vehicle and/or an operator of the vehicle.

Unless otherwise expressly indicated herein, all numerical values indicating mechanical/thermal properties, compositional percentages, dimensions and/or tolerances, or other characteristics are to be understood as modified by the word "about" or "approximately" in describing the scope of the present disclosure. This modification is desired for various reasons including industrial practice, manufacturing technology, and testing capability.

As used herein, the phrase at least one of A, B, and C should be construed to mean a logical (A OR B OR C), using a non-exclusive logical OR, and should not be construed to mean "at least one of A, at least one of B, and at least one of C."

The description of the disclosure is merely exemplary in nature and, thus, variations that do not depart from the substance of the disclosure are intended to be within the scope of the disclosure. Such variations are not to be regarded as a departure from the spirit and scope of the disclosure.

In the figures, the direction of an arrow, as indicated by the arrowhead, generally demonstrates the flow of information (such as data or instructions) that is of interest to the illustration. For example, when element A and element B exchange a variety of information, but information transmitted from element A to element B is relevant to the illustration, the arrow may point from element A to element B. This unidirectional arrow does not imply that no other information is transmitted from element B to element A. Further, for information sent from element A to element B, element B may send requests for, or receipt acknowledgements of, the information to element A.

In this application, the term "module" and/or "controller" may refer to, be part of, or include: an Application Specific Integrated Circuit (ASIC); a digital, analog, or mixed analog/digital discrete circuit; a digital, analog, or mixed analog/digital integrated circuit; a combinational logic circuit; a field programmable gate array (FPGA); a processor circuit (shared, dedicated, or group) that executes code; a memory circuit (shared, dedicated, or group) that stores code executed by the processor circuit; other suitable hardware components that provide the described functionality; or a combination of some or all of the above, such as in a system-on-chip.

The term memory is a subset of the term computer-readable medium. The term computer-readable medium, as used herein, does not encompass transitory electrical or electromagnetic signals propagating through a medium (such as on a carrier wave); the term computer-readable medium may therefore be considered tangible and nontransitory. Non-limiting examples of a nontransitory, tangible computer-readable medium are nonvolatile memory circuits (such as a flash memory circuit, an erasable programmable read-only memory circuit, or a mask read-only circuit), volatile memory circuits (such as a static random access memory circuit or a dynamic random access memory circuit), magnetic storage media (such as an analog or digital magnetic tape or a hard disk drive), and optical storage media (such as a CD, a DVD, or a Blu-ray Disc).

The apparatuses and methods described in this application may be partially or fully implemented by a special purpose computer created by configuring a general-purpose computer to execute one or more particular functions embodied in computer programs. The functional blocks, flowchart components, and other elements described above serve as software specifications, which can be translated into the computer programs by the routine work of a skilled technician or programmer.

What is claimed is:

1. A method comprising:
   determining a travel state of a subject vehicle based on vehicle data provided by a component within the subject vehicle, wherein the travel state includes a plurality of metrics associated with the subject vehicle, and wherein the plurality of metrics indicate a speed of the subject vehicle, a location of the subject vehicle, and a travel direction of the subject vehicle;
   selecting one or more desired topics from a set of subscriptions of a publish-subscribe messaging system based on the travel state, wherein the set of subscriptions comprise one or more topics stored in a database of the publish-subscribe messaging system, and the one or more desired topics are selected from among the one or more topics; and
   subscribing to the one or more desired topics provided by a remote server.

2. The method of claim 1, wherein selecting the one or more desired topics from the set of subscriptions based on the travel state further comprises identifying the one or more desired topics based on the plurality of metrics.

3. The method of claim 1, wherein the component includes one or more vehicle sensors and the method further comprises:
   determining the plurality of metrics indicate whether the subject vehicle is in a parked state, whether the subject vehicle is traveling at a predefined speed, and whether the subject vehicle is at a predefined location;
   in response to the subject vehicle being in the parked state, the one or more desired topics include topics associated with point-of-interest information;
   in response to the subject vehicle traveling at the predefined speed, the one or more desired topics include topics associated with at least one of traffic information and safety information; and
   in response to the subject vehicle being located at the predefined location, the one or more desired topics include topics associated with at least one of weather information and construction information.

4. The method of claim 1, wherein:
   determining the travel state further comprises determining a status of the component;
   the status indicates whether a fault is associated with the component; and
   in response to status indicating the fault, the one or more desired topics include topics associated with safety information.

5. The method of claim 4, wherein the component includes one or more vehicle sensors.

6. The method of claim 1, wherein subscribing to the one or more desired topics further comprises:
   modifying a subscription request message to include data indicative of the one or more desired topics; and
   transmitting the subscription request message to the remote server.

7. The method of claim 1, wherein the vehicle data is provided by a roadside unit.

8. The method of claim 1, wherein selecting the one or more desired topics from the set of subscriptions based on the travel state further comprises:
   comparing the one or more desired topics to one or more currently subscribed topics of the subject vehicle, wherein the one or more currently subscribed topics are stored in the database and are among the one or more topics; and
   modifying the one or more currently subscribed topics of the subject vehicle to match the one or more desired topics in response to the comparing indicating that the one or more currently subscribed topics do not match the one or more desired topics.

9. The method of claim 1 further comprising transmitting a topic suggestion message that identifies the one or more desired topics to a remote vehicle communicatively coupled to the subject vehicle.

10. The method of claim 1, wherein the one or more desired topics represent at least one of traffic information and point-of-interest information.

11. A subscription management system for a subject vehicle, the subscription management system comprising:
    a processor;
    a subscription database of a message queueing telemetry transport (MQTT) messaging system storing a set of subscriptions, wherein the set of subscriptions comprise one or more topics; and
    a nontransitory computer-readable medium comprising instructions that are executable by the processor, wherein the instructions comprise:
       determining a travel state of the subject vehicle based on vehicle data provided by a component within the subject vehicle, wherein the travel state includes a plurality of metrics associated with the subject vehicle, and wherein the plurality of metrics indicate a speed of the subject vehicle, a location of the subject vehicle, and a travel direction of the subject vehicle;
       selecting one or more desired topics from the set of subscriptions based on the travel state, wherein the one or more desired topics are selected from among the one or more topics; and
       subscribing to the one or more desired topics provided by a remote server.

12. The subscription management system of claim 11, wherein the instructions for selecting the one or more desired topics from the set of subscriptions based on the travel state further comprises identifying the one or more desired topics based on the plurality of metrics.

13. The subscription management system of claim 11, wherein the component includes one or more vehicle sensors, and wherein the instructions further comprise:
    determining the plurality of metrics indicate whether the subject vehicle is in a parked state, whether the subject vehicle is traveling at a predefined speed, and whether the subject vehicle is at a predefined location;

in response to the subject vehicle being in the parked state, the one or more desired topics include topics associated with point-of-interest information;

in response to the subject vehicle traveling at the predefined speed, the one or more desired topics include topics associated with at least one of traffic information and safety information; and in response to the subject vehicle being located at the predefined location, the one or more desired topics include topics associated with at least one of weather information and construction information.

14. The subscription management system of claim 11, wherein:

the instructions for determining the travel state further comprises determining a status of the component;

the status indicates whether a fault is associated with the component; and in response to status indicating the fault, the one or more desired topics include topics associated with safety information.

15. The subscription management system of claim 11, wherein the component includes one or more vehicle sensors.

16. The subscription management system of claim 11, wherein the instructions for subscribing to the one or more desired topics further comprises:

modifying a subscription request message to include data indicative of the one or more desired topics; and transmitting the subscription request message to the remote server.

17. The subscription management system of claim 11, wherein:

the vehicle data is provided by a roadside unit; and the instructions for selecting the one or more desired topics from the set of subscriptions based on the travel state further comprises:

comparing the one or more desired topics to one or more currently subscribed topics of the subject vehicle, wherein the one or more currently subscribed topics are stored in the subscription database and are among the one or more topics; and modifying the one or more currently subscribed topics of the subject vehicle to match the one or more desired topics in response to the comparing indicating that the one or more currently subscribed topics do not match the one or more desired topics.

* * * * *